Apr. 17, 1923.

K. A. LEHMANN

CASE SHIFT MECHANISM

Filed Aug. 3, 1921

Patented Apr. 17, 1923.

1,451,737

UNITED STATES PATENT OFFICE.

KARL AUGUST LEHMANN, OF ESSEN, GERMANY, ASSIGNOR TO FRIED. KRUPP AKTIEN-GESELLSCHAFT, OF ESSEN-ON-THE-RUHR, GERMANY.

CASE-SHIFT MECHANISM.

Application filed August 3, 1921. Serial No. 489,577.

*To all whom it may concern:*

Be it known that I, KARL AUGUST LEHMANN, residing at Essen, Germany, a citizen of the German Republic, have invented a certain new and useful Improvement in Case-Shift Mechanism, of which the following is a specification.

The invention relates to case shift mechanisms for typewriting machines.

In the shifting mechanisms for the paper roller or platen of typewriting machines hitherto known there is produced, on the shifting of the paper roller or platen, a disturbing striking noise.

The present invention relates to a shifting mechanism in the operation of which no disturbing noise is produced.

The invention will be described with reference to the accompanying drawings in which two embodiments of the subject-matter of the invention are shown by way of example.

Figure 1:
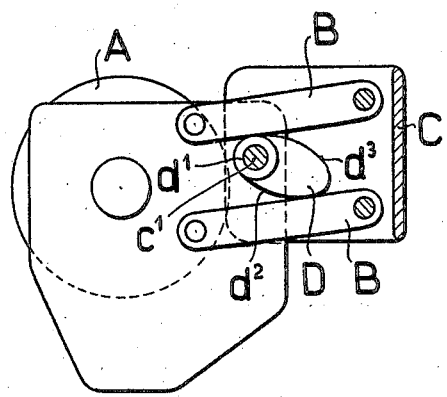
Figure 2:
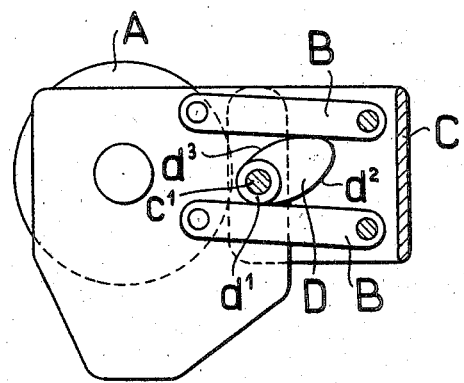
Figure 3:
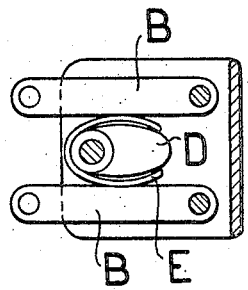

Figures 1 and 2 illustrate the first example and show the paper roller or platen and the various parts connected therewith in two different positions, while Figure 3 shows the second example.

The example illustrated in Figures 1 and 2 will be described first.

The platen A is connected on both sides by links B with the carriage frame C of the typewriting machine and can be raised in the well known way by the operation of the shifting lever (not illustrated), from the lower position, shown in Figure 1, into the raised position shown in Figure 2. The stroke of the platen is limited by the hub $d^1$ of a rolling lever D, which rotates on a pin $c^1$ fixed to the frame of the carriage frame C between the links B. The faces $d^2$ and $d^3$ of the rolling lever D next to the links B are curved.

When the various parts are in the position shown in Figure 1, the face $d^2$ of the rolling lever D bears against the lower link B, while, when the parts are in the position of Figure 2, the face $d^3$ bears against the upper link. The curvature of the faces $d^2$ and $d^3$ is so arranged that during the change of the platen from the position shown in Figure 1 to the position shown in Figure 2, the lower link is permanently in contact with the face $d^2$ and the upper link B with the face $d^3$ of the rolling lever D.

In consequence of the permanent contact between the links B and the lever D no disturbing noise takes place during the shift of the platen A when at the end of the stroke of this latter the corresponding link B bears against the hub $d^1$ of the rolling lever D.

In the second example shown at Figure 3, the damping action of the rolling lever D is still further increased. It differs from the construction shown in Figure 1 merely by the fact that between the links B and the rolling lever D there is inserted a flat spring E in the manner shown in the drawing.

Claims.

1. In a case shift mechanism for typewriting machines, a platen, means pivotally connecting said platen to the frame of the typewriting machine and means for shifting the platen and limiting the movement of said platen, said means comprising a rolling lever positioned to constantly engage said connecting means, the hub of said rolling lever forming a stop for limiting the movement of said platen.

2. In a case shift mechanism for typewriting machines, a platen, means connecting said platen to the frame of the machine and a rolling lever pivoted to the frame of the machine and disposed so as to engage said platen connecting means during its shifting movement and for limiting said shifting movement in both directions.

3. In a typewriting machine, a platen, links pivotally supporting said platen upon the frame of the machine and permitting a relative shifting movement thereof, a rolling lever formed with a pair of curved surfaces to shift said links and a hub, said rolling lever being disposed with its hub projecting into the path of said links to limit the movement of said platen in both directions, said curved surfaces engaging said links during the movement of said platen from one position to another.

4. A case shift mechanism for typewriting machines comprising in combination a platen, links pivotally supporting said platen upon the frame of the machine, a rolling lever formed with a hub and a pair of curved surfaces, said rolling lever being positioned so that its hub portion projects into the path of said links to limit the shifting movement of said platen, a spring secured to said rolling lever and about its curved surfaces, said spring bearing against said links during the entire movement of said platen roller.

The foregoing specification signed at Essen, Germany, this 6th day of July, 1921.

KARL AUGUST LEHMANN.